Dec. 11, 1951 M. SOSS 2,578,097
VEHICLE MOUNTED CHAIN-SAW WOOD SAWING MACHINE
Filed Aug. 13, 1948 2 SHEETS—SHEET 1
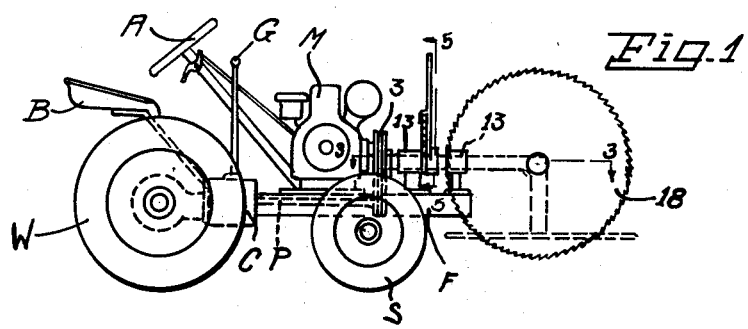
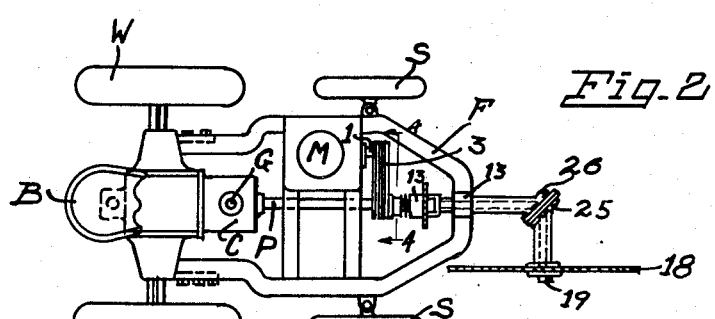
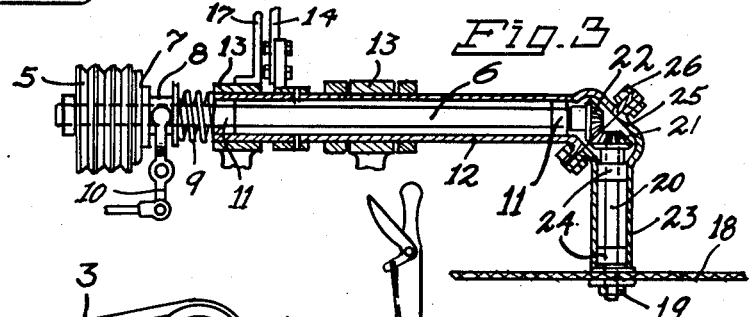
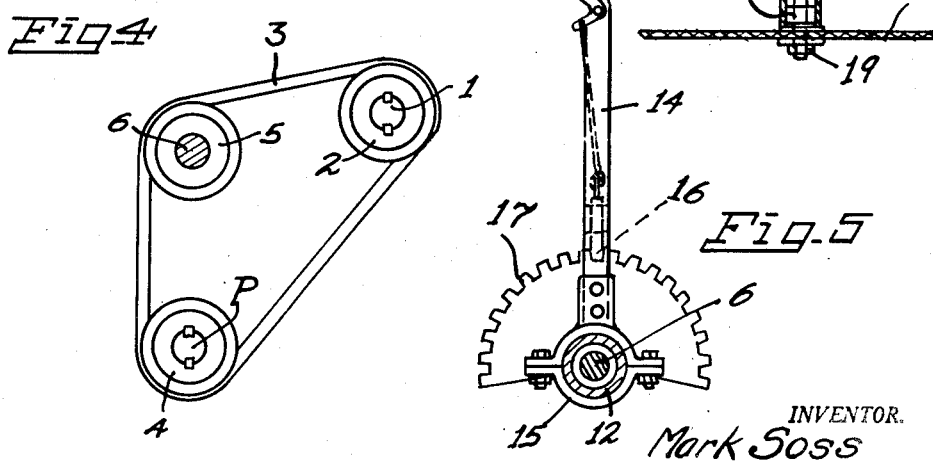
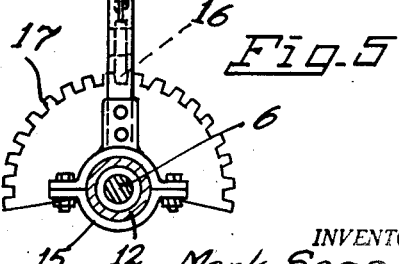
INVENTOR.
Mark Soss
BY
ATTORNEY Dec. 11, 1951          M. SOSS          2,578,097
VEHICLE MOUNTED CHAIN-SAW WOOD SAWING MACHINE
Filed Aug. 13, 1948          2 SHEETS—SHEET 2
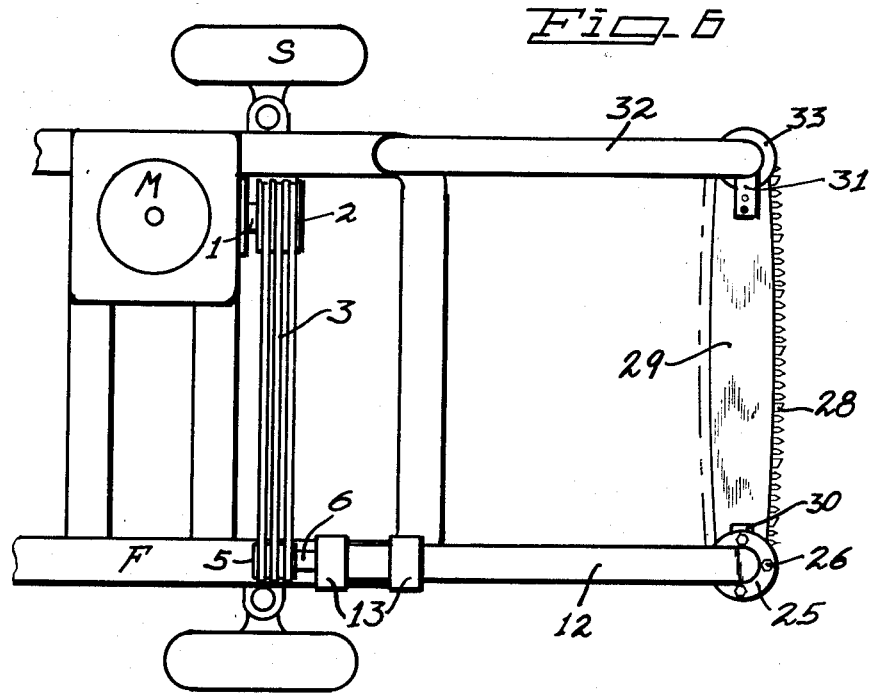
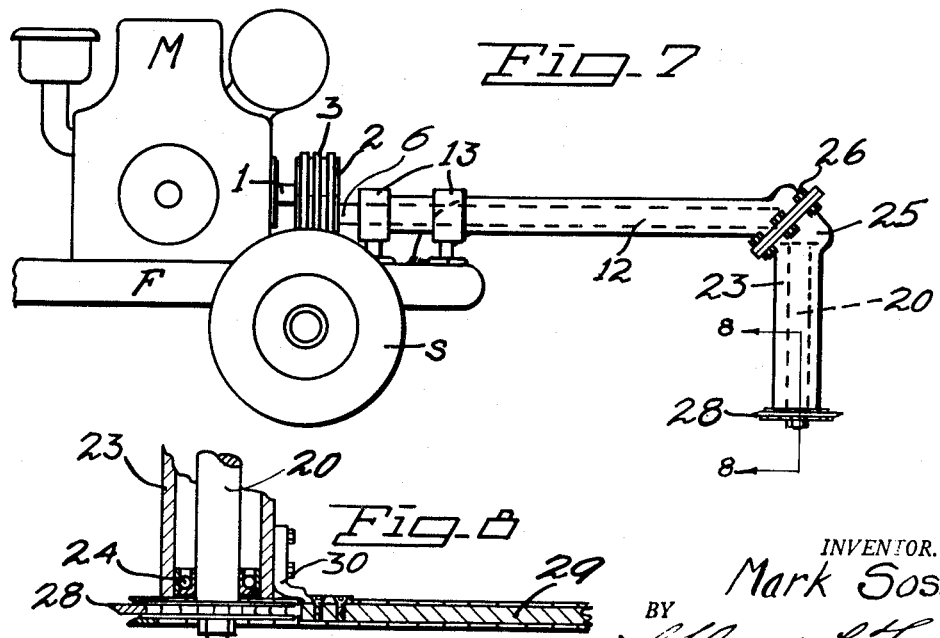
INVENTOR.
Mark Soss
BY
ATTORNEY Patented Dec. 11, 1951

2,578,097

UNITED STATES PATENT OFFICE 2,578,097

VEHICLE MOUNTED CHAIN-SAW WOOD SAWING MACHINE

Mark Soss, Spokane, Wash.

Application August 13, 1948, Serial No. 44,142

1 Claim. (Cl. 143—32)

The present invention relates to an improved vehicle mounted chain-saw wood sawing machine adapted for field work in felling standing trees, cutting logs, and obstructions, and convertible for selective use with a circular saw and an endless chain saw. Means are also provided for adjusting a circular saw to operative positions within a wide range between vertical and horizontal positions; and the sawing machine is readily adapted for installation on an automotive vehicle, as a tractor, for transportation purposes and for taking off power from the motor or engine of the automotive vehicle.

The novel sawing machine of my invention includes a minimum number of parts that may be manufactured with facility at low cost of production, and the parts may be assembled with convenience, and installed and adjusted with ease, to provide a reliable and durable sawing machine for various uses. The invention consists in certain novel features of construction and combinations and arrangements of parts as will hereinafter be described and more particularly set forth in the appended claim.

In the accompanying drawings I have illustrated two complete examples of physical embodiments of my invention wherein the parts are combined and arranged in accord with modes I have devised for the practical application of the principles of my invention. It will however be understood that changes and alterations are contemplated and may be made in these exemplifying drawings and mechanical structures, within the scope of my claim without departing from the principles of the invention.

Figure 1 is a view in side elevation disclosing a tractor equipped with the sawing machine of my invention for selective use with a circular saw; and Figure 2 is a top plan view of the structure in Fig. 1.

Figure 3 is an enlarged longitudinal horizontal sectional view at line 3—3 of Fig. 1.

Figure 4 is a diagrammatic view at line 4—4 of Fig. 2 showing the power take off or drive mechanism from a motor or engine.

Figure 5 is a vertical sectional view at line 5—5 of Fig. 1 showing the lever mechanism for rotatably adjusting the circular saw unit.

Figure 6 is a plan view of part of a tractor equipped with a chain saw and its operating mechanism.

Figure 7 is a side elevation of the structure in Fig. 6; and

Figure 8 is a sectional detail view, enlarged, at line 8—8 of Fig. 7.

In order that the general relation and utility of parts may readily be understood I have shown in Figs. 1 and 2 a conventional tractor of the four wheel type including a main frame F with the rear drive wheels W, and front steering wheels S controlled by wheel A, and equipped with a suitable power plant as a motor or engine M. The driver or operator occupies a seat B, and the gear shift lever G controls gears in the case C in combination with the propulsion shaft P of the tractor. A suitable driving mechanism for propulsion, and for operating the sawing machine, is illustrated as driven from the motor shaft 1 having a drive pulley 2 of the multiple groove type over which the multiple belts 3 pass to driven pulley 4 on the propulsion shaft and around driven pulley 5 on the saw operating shaft 6. The saw operating shaft 6, which extends longitudinally of the tractor in parallelism with the motor shaft and the propulsion shaft, is equipped with a suitable clutch 7 in combination with the multi-groove pulley 5, and a typical spool 8, spring 9, and hand lever mechanism 10 are shown for the clutch mechanism.

The saw operating shaft 6 is journaled by spaced bearings 11, 11, within a rotatably adjustable and tubular housing 12, and the housing itself is journaled in spaced bearings 13, 13, rigid with the main frame F of the tractor.

For rotatably adjusting the housing in its bearings within approximately one hundred and ninety degrees, a hand lever 14 is rigidly clamped at 15 on the exterior of the housing and equipped with a ratchet and pawl device 16 for co-action with a segmental rack gear 17 that is rigidly mounted on an adjacent bearing member 13 of the housing, and it will be apparent that the circular saw 18 may be turned and adjusted from horizontal position to vertical position, and also turned at other angles within this range. In Fig. 1 the saw is in vertical position and adapted to cut logs in horizontal position, and when turned to horizontal position the saw is adapted for felling standing trees or timber.

The circular saw 18 is bolted at 19 on the free end of a saw arbor or shaft 20, and this angularly disposed arbor is driven from the saw operating shaft 6 through an intermediate gear couple including bevel gear 21 on the arbor and 22 on the shaft. The arbor is enclosed and stabilized within a tubular column or sleeve 23 and the sleeve is equipped with spaced journal bearings 24 for the arbor. The front end of the housing and the inner end of the sleeve are rigidly united by a flanged elbow joint 25 that is bolted together at 26, in order that the housing and sleeve and the shaft and arbor, by means of the hand lever 14, may be turned or adjusted to selective position for the saw.

In the modified form of the invention shown in Figs. 6, 7, and 8, the invention is converted for use as a chain sawing machine, and operatively installed upon the tractor, the front portion of which is illustrated in the top plan and side elevation views.

In this adaptation of the invention, the lower end of the saw arbor 20 is equipped with a sprocket wheel 26 for the horizontally disposed endless chain saw 28, which extends transversely across the front of the tractor and is guided by the spacer blade or keeper 29 attached at one end by bracket 30 to the exterior of the sleeve 23.

The other end of the guide blade is attached by bracket 31 to the lower end of a leg rigidly depending from a longitudinally disposed frame bar 32 rigid with the frame F, and the chain saw passes around a horizontally disposed idler sprocket wheel 33 journaled in the lower end of the depending leg.

The same motor operated driving mechanism and equipment are employed for supplying power to the operating shaft 6 within the housing 12, and the housing is rigidly mounted in bearings 13 mounted on the main frame F.

Having thus fully described my invention, what I claim as new and desire to secure by Letters Patent is:

In a power-operated saw, a main frame, bars carried by and extending forwardly from said frame at opposite sides thereof and having downwardly extending arms at their front ends, one bar and its arm being tubular and having adjoining ends detachably secured together and forming a gear housing, a drive shaft and a driven shaft rotatably mounted through the tubular bar and its arm and having adjoining ends connected with each other by intermeshing beveled gears enclosed in the gear housing, said drive shaft having its rear end projecting from the tubular bar and the driven shaft having its lower end projecting from the lower end of the tubular arm and carrying a sprocket wheel, an idler sprocket wheel at the lower end of the arm of the other bar, a bridging bar extending horizontally between the sprockets and supported by upwardly extending brackets secured to lower end portions of the arms, and endless chain saw trained about the sprockets and having front and rear portions extending longitudinally of the bridging bar in confronting relation to the front and rear edge faces thereof, a motor mounted upon said frame, and means for transmitting rotary motion between said motor and the rear end of the drive shaft.

MARK SOSS.

REFERENCES CITED

The following references are of record in the file of this patent:

UNITED STATES PATENTS

| Number | Name | Date |
|---|---|---|
| 1,276,579 | Scott | Aug. 20, 1918 |
| 1,462,764 | Nyquist et al. | July 24, 1923 |
| 1,602,357 | Georgelis | Oct. 5, 1926 |
| 2,348,588 | Arsneau | May 9, 1944 |
| 2,365,408 | Hillyer | Dec. 19, 1944 |
| 2,412,704 | Jaques | Dec. 17, 1946 |
| 2,312,287 | Renner | Feb. 23, 1947 |
| 2,435,192 | Arsneau | Feb. 3, 1948 |
| 2,461,188 | Stoner | Feb. 8, 1949 |

FOREIGN PATENTS

| Number | Country | Date |
|---|---|---|
| 317,926 | Germany | Jan. 7, 1920 |
| 118,817 | Australia | Aug. 14, 1944 |